United States Patent
Andersson et al.

(10) Patent No.: US 12,388,669 B2
(45) Date of Patent: Aug. 12, 2025

(54) METHOD AND APPARATUS FOR SERVICE CHARGING IN A COMMUNICATION NETWORK UTILIZING CONSUMPTION CONTROL INFORMATION FOR A PLURALITY OF DEVICES WITH SHARE A SUBSCRIPTION

(71) Applicant: Telefonaktiebolaget LM Ericsson (publ), Stockholm (SE)

(72) Inventors: Nicklas Andersson, Lyckeby (SE); Peter Skarphagen, Lyckeby (SE); Jenny Österling, Ronneby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 17/916,886

(22) PCT Filed: Apr. 9, 2020

(86) PCT No.: PCT/SE2020/050377
§ 371 (c)(1),
(2) Date: Oct. 4, 2022

(87) PCT Pub. No.: WO2021/206599
PCT Pub. Date: Oct. 14, 2021

(65) Prior Publication Data
US 2023/0155849 A1    May 18, 2023

(51) Int. Cl.
*H04M 15/00* (2024.01)
*H04L 12/14* (2006.01)

(52) U.S. Cl.
CPC ............ *H04L 12/14* (2013.01); *H04M 15/64* (2013.01); *H04M 15/65* (2013.01)

(58) Field of Classification Search
CPC .... H04L 12/14; H04L 12/1403; H04M 15/64; H04M 15/65; H04M 15/44; H04M 15/00;
(Continued)

(56) References Cited

U.S. PATENT DOCUMENTS 9,338,306 B2 * 5/2016 Maguire ................. H04L 67/51
9,743,269 B1    8/2017 Yadav et al.
(Continued)

FOREIGN PATENT DOCUMENTS

EP    2341660 A1    7/2011
WO    2020043295 A1    3/2020

OTHER PUBLICATIONS

"3rd Generation Partnership Project; Technical Specification Group Service and System Aspects; Telecommunication management; Charging management; Diameter charging applications (Release 8)", 3GPP TS 32.299 V8.9.0, Dec. 2009, 142 pages.
(Continued)

*Primary Examiner* — Pakee Fang
(74) *Attorney, Agent, or Firm* — Murphy, Bilak & Homiller, PLLC

(57) ABSTRACT

Charging operations carried out in relation to service consumption by users of a communication network reduce signaling overhead and memory or storage requirements by adopting a bifurcated approach to structuring and accessing the data containers used for controlling and tracking service consumption by individual users commonly governed by the same consumption control information. With bifurcation, a parent data container holds the common consumption control information commonly applicable to each user, while an individual child data container for each user holds consumption-tracking information specific to the user. The approach reduces signaling overhead inasmuch as operations involving only the consumption control information need not retrieve or access the child data containers, and the approach reduces overall storage requirements by eliminating redundant inclusion of the common information in the child data containers.

16 Claims, 9 Drawing Sheets

(58) Field of Classification Search
CPC ...... H04M 15/41; H04M 15/58; H04M 15/61; H04M 15/70; H04M 15/853; H04M 15/854; H04M 15/765; H04M 15/7652; H04M 15/775; H04W 4/70; H04W 4/24
See application file for complete search history.

(56) References Cited

U.S. PATENT DOCUMENTS

| | | | |
|---|---|---|---|
| 10,349,240 B2* | 7/2019 | Senarath | H04W 4/24 |
| 11,277,522 B2* | 3/2022 | Lu | H04M 15/65 |
| 11,411,755 B2* | 8/2022 | Gardella | H04L 12/14 |
| 11,937,151 B2* | 3/2024 | Muralimanohar | H04L 12/14 |
| 2014/0073285 A1 | 3/2014 | Lehane et al. | |
| 2015/0029894 A1 | 1/2015 | Lu et al. | |
| 2015/0105044 A1* | 4/2015 | Maguire | H04M 15/58 455/406 |
| 2015/0105045 A1 | 4/2015 | Rolfe et al. | |
| 2015/0271344 A1* | 9/2015 | Bertze | H04W 4/24 455/408 |
| 2016/0294569 A1* | 10/2016 | Chen | H04M 15/66 |
| 2019/0289444 A1 | 9/2019 | Senarath et al. | |
| 2020/0100075 A1* | 3/2020 | Chai | H04M 15/8228 |

OTHER PUBLICATIONS

"3rd Generation Partnership Project; Technical Specification Group Services and System Aspects; Telecommunication management; Charging management; Charging architecture and principles (Release 16)", 3GPP TS 32.240 V16.0.0, Mar. 2019, 61 pages.

"3rd Generation Partnership Project; Technical Specification Group Services and System Aspects; Telecommunication management; Charging management; Diameter charging applications (Release 15)", 3GPP TS 32.299 V15.0.0, Sep. 2017, 199 pages.

* cited by examiner

METHOD AND APPARATUS FOR SERVICE CHARGING IN A COMMUNICATION NETWORK UTILIZING CONSUMPTION CONTROL INFORMATION FOR A PLURALITY OF DEVICES WITH SHARE A SUBSCRIPTION

TECHNICAL FIELD

The present invention relates to service charging in a communication network.

BACKGROUND

Charging for the use of communication services provided through telecommunications communication networks may be based on offline charging, where the charging information does not have a real-time effect on the communication service being rendered, or online charging, where the charging information may have a real-time effect on the service rendered. Online charging, therefore, involves communication session/service control. Relevant example details related to DIAMETER-based charging in Third Generation Partnership Project (3GPP) networks, such as GSM/UMTS/EPS networks, appear in the 3GPP Technical Specification (TS) 32.299 V15.0.0 (2017 Sep. 21).

In an example online charging scenario, a User Equipment (UE) requests initial or continued usage of a communication service subject to metered usage or charging, with the request expressed in terms of "service units" representing quanta of service consumption. Example service units are megabytes or minutes, and they represent the smallest granularity for metering service usage. A "rating function" rates the requested service units and a "session management function" or other Online Charging System (OCS) function cooperates with an Account Balance Management Function (ABMF) to determine whether an account linked to a subscription associated with the UE has a credit balance sufficient to cover the rated units.

"Credit" in this sense has a broad meaning, as credit may be expressed in monetary units or non-monetary units, such as minutes, megabytes, or any mix of monetary and non-monetary units. Replenishable credit containers stand as one example of a data structure that holds credit units for use in authorizing service requests, but single-use containers may also be used in charging.

More generally, conventional charging-system operations create, store, and manipulate data containers on a per device basis, with each data container containing the information needed to control and track service consumption by a corresponding user device. FIG. 1 illustrates a corresponding example, where a consolidated data container 2 includes combined control and tracking information 4 for a respective user device, with the diagram avoiding clutter by showing only three consolidated data containers 2, each corresponding to a respective one among three user devices labeled "DEVICE 1", "DEVICE 2", and "DEVICE 3".

As a non-limiting example, the combined control and tracking information 4 include a credit allowance, specifying a certain number of "units" debited for consumption of a communication service by the corresponding user device. Other example data included in the combined control and tracking information 4 includes validity information, such as an expiration time for the credit allowance or a validity window applicable to the credit allowance. As a user device consumes a service or services governed by the credit allowance, the charging system accesses and updates the consolidated data container 2 corresponding to the user device.

Several issues with the foregoing approach are recognized herein and advantageous alternative approaches described in example form herein eliminate or at least mitigate the issues. Although not limited to Machine Type Communication (MTC) or Internet-of-Things (IoT) devices, the contemplated approaches may offer particular advantages in the context of potentially large populations of MTC or IoT devices deployed by a corporate entity or other common owner under a common subscription with a network operator.

SUMMARY

Charging operations carried out in relation to service consumption by users of a communication network reduce signaling overhead and memory or storage requirements by adopting a bifurcated approach to structuring and accessing the data containers used for controlling and tracking service consumption by individual users commonly governed by the same consumption control information. With bifurcation, a parent data container holds the common consumption control information commonly applicable to each user, while an individual child data container for each user holds consumption-tracking information specific to the user. The approach reduces signaling overhead inasmuch as operations involving only the consumption control information need not retrieve or access the child data containers, and the approach reduces overall storage requirements by eliminating redundant inclusion of the common information in the child data containers.

An example method of operation performed by a charging system node of a charging system associated with a communication network includes recording consumption control information in a parent data container, where the parent data container is common to a plurality of user devices that share a subscription for using the communication network. The consumption control information commonly governs consumption by each of the user devices of units that represent corresponding quanta of metered use of a communication service provided via the communication network, and operations further include the charging system node recording individual consumption information for each user device in a correspondingly created child data container that is specific to the user device. The individual consumption information reflects unit consumption by the user device that is subject to the consumption control information in the parent data container.

For charging-system operations that involve only the consumption control information, the method includes accessing the parent data container without accessing any child data container. For charging-system operations involving unit consumption by a particular user device that is governed by the consumption control information, the method includes forming a non-persistent working data container, tracking the unit consumption in the working data container, along with holding the consumption control information in the working data container to govern the unit consumption, and, in conjunction with releasing the working data container, updating the individual consumption information recorded in the corresponding child data container, according to the tracked unit consumption.

An example charging system node is configured for operation in a charging system associated with a communication network and includes communication interface circuitry. The communication interface circuitry is configured for communicatively coupling the charging system node to one or more other nodes of the charging system, and the processing circuitry is operatively associated with the communication interface circuitry and is configured to record consumption control information in a parent data container that is common to a plurality of devices that share a subscription for using the communication network. The consumption control information commonly governs consumption by each of the user devices of units that represent corresponding quanta of metered use of a communication service provided via the communication network. Further, the processing circuitry is configured to record individual consumption information for each user device in a correspondingly created child data container that is specific to the user device. The individual consumption information reflects unit consumption by the user device that is subject to the consumption control information in the parent data container.

For charging-system operations that involve only the consumption control information, the processing circuitry is configured to access the parent data container without accessing any child data container. For charging-system operations involving unit consumption by a particular one of the user device that is governed by the consumption control information, the processing circuitry is configured to form a non-persistent working data container, track the unit consumption in the working data container, along with holding the consumption control information in the working data container to govern the unit consumption, and, in conjunction with releasing the working data container, update the individual consumption information recorded in the corresponding child data container, according to the tracked unit consumption.

In another example implementation, a charging system node includes a first recording module configured to record consumption control information in a parent data container that is common to a plurality of devices that share a subscription for using the communication network. The consumption control information commonly governs consumption by each of the user devices of units that represent corresponding quanta of metered use of a communication service provided via the communication network, and the charging system node includes a second recording module configured to record individual consumption information for each user device in a correspondingly created child data container that is specific to the user device. The individual consumption information reflects unit consumption by the user device that is subject to the consumption control information in the parent data container.

Further, the charging system node includes an operations module that is configured to access the parent data container without accessing any child data container, for charging-system operations that involve only the consumption control information. For charging-system operations involving unit consumption by a particular one of the user device that is governed by the consumption control information, the operations module is configured to form a non-persistent working data container, track the unit consumption in the working data container, along with holding the consumption control information in the working data container to govern the unit consumption, and, in conjunction with releasing the working data container, update the individual consumption information recorded in the corresponding child data container, according to the tracked unit consumption.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 2:
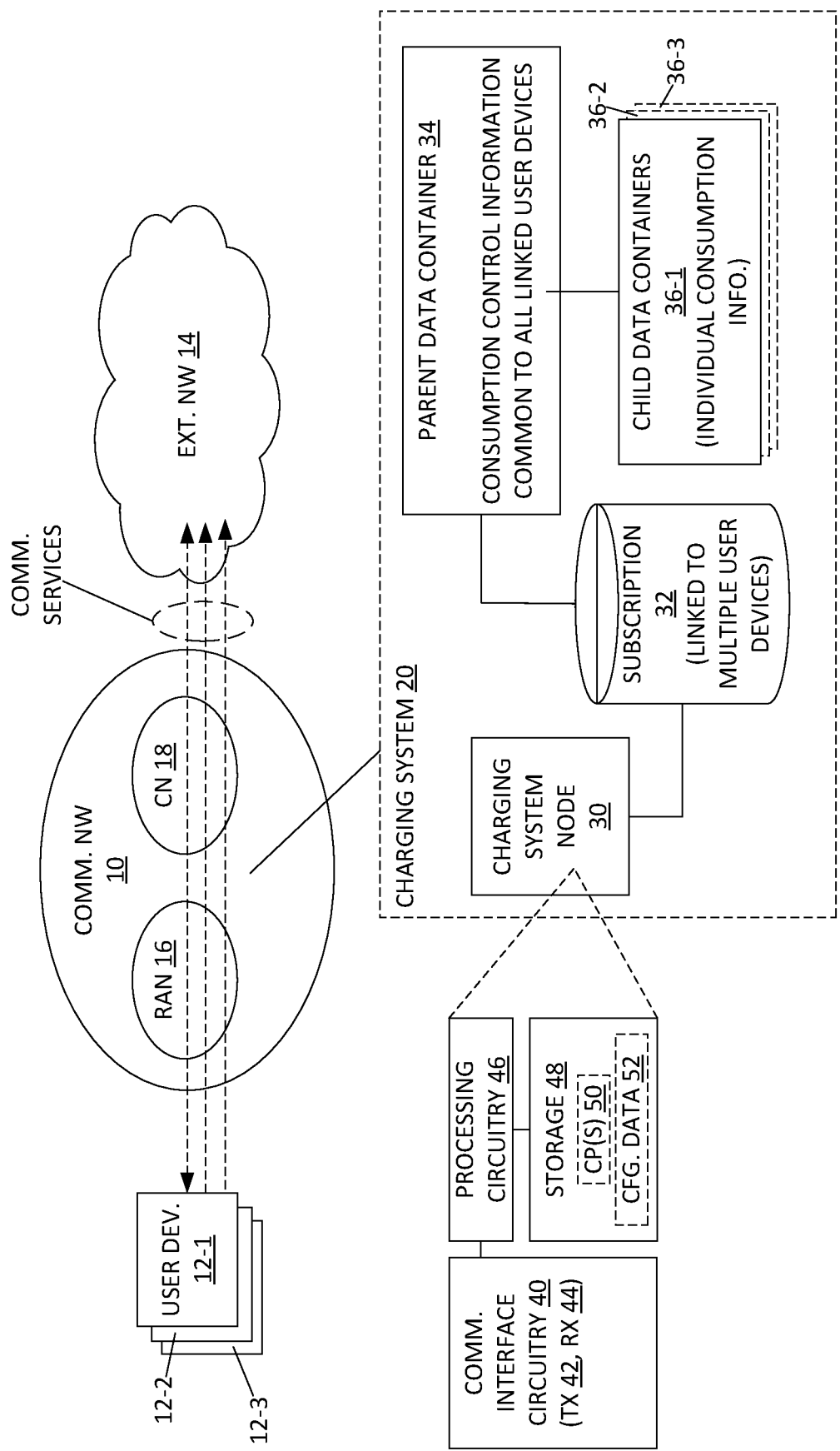
FIG. 2 is a block diagram of an example communication network, with an embodiment of a charging system node.

FIG. 2 illustrates a communication network 10 in an example configuration, where the network 10 provides one or more communication services to user devices 12, e.g., by operating as an access network that communicatively couples the user devices 12 to each other or to servers or equipment accessible via one or more external networks 14. The Internet or another packet data network stands as one example of an external network.

Figure 1:
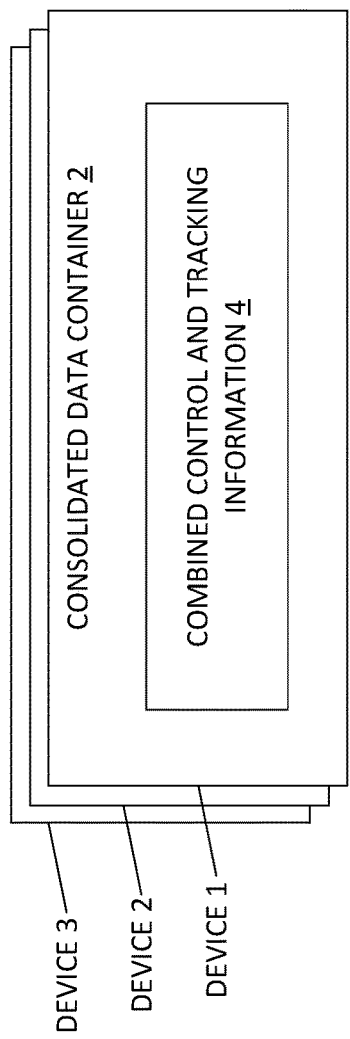
FIG. 1 is a diagram of a consolidated data container used in controlling and tracking service consumption by a user device consuming a service provided by a communication network.

In at least one embodiment, the network 10 is a wireless communication network, such as a wide area network operating according to Third Generation Partnership Project (3GPP) specifications. Corresponding elements of the network 10 include a Radio Access Network (RAN) 16 and a Core Network (CN) 18, with FIG. 1 offering simplified views of the RAN 16 and the CN 18. As another simplification, FIG. 1 depicts three user devices 12, as 12-1, 12-2, and 12-3. Greater or lesser number of user devices 12 may be supported by the network 10 at any given time, and user devices 12 of different types and capabilities may be involved.

Although certain examples in this discussion refer to cases where the user devices 12 are Machine Type Communication (MTC) devices or Internet-of-Things (IoT) devices, the examples are non-limiting. Unless otherwise specified, the term "user device" interchanges with "user equipment" or "UE" and denotes essentially any type of apparatus having radio circuitry and supporting processing circuitry configured for communicatively coupling to the network 10, according to the signal types, timings, and protocols used by the network 10. Looking specifically at a wireless-network example, the RAN 16 of the depicted network 10 includes one or more radio access nodes that provide an air interface for downlink radio signals transmitted from the network 10 for the user devices 12, and uplink radio signals transmitted by the user devices 12 for the network 10.

A charging system 20 is included in or otherwise associated with the network 10 and provides online charging operations for authorizing and tracking the consumption of communication services by respective ones of the user devices 12, as made available by or through the network 10. The charging system 20 may be referred to as an "online charging system" and it comprises one or more "nodes" that may be implemented via one or more computer servers executing program instructions that configure the server(s) for charging operations. Implementation of the charging system 20 admits significant flexibility, including implementation of the charging system 20 in whole or in part using virtualized processing circuitry provided via one or more host computing systems in a data center.

A charging system node 30 of the charging system 20 uses a bifurcated data-container approach that offers significant advantages in terms of reduced signaling overhead and reduced storage or memory requirements, when compared to the conventional approach reflected in FIG. 1. The bifurcated data-container approach involves a subscription 32 and corresponding parent and child data containers 34 and 36, respectively. As an example, for each of three user devices 12, there is a corresponding child data container 36, e.g., the child data container 36-1 corresponds to the device 12-1, the child data container 36-2 corresponds to the device 12-2, and so on. A caveat that offers additional efficiency is that a child data container 36 may not be created until "needed."

Before delving into operating examples involving the parent/child arrangement of data containers, the charging system node 20 in an example implementation includes communication interface circuitry 40, including one or more kinds of transmitter circuitry 42 and receiver circuitry 44. Non-limiting examples of the communication interface circuitry include an Ethernet-based interface or other computer-network interface. In other variations, such as where the charging system node 30 is implemented in a distributed or virtualized computing environment, the communication interface circuitry 40 may be a data-bus or other processor-to-processor interface. Still other examples include wireless transmit/receive circuitry and associated protocol processors. In short, while the communication interface circuitry 40 is subject to variation, it includes circuitry for sending and receiving signals via a physical medium.

Other elements of the example charging system node 30 include processing circuitry 46 comprising fixed circuitry or programmatically-configured circuitry, or a mix of fixed circuitry and programmatically configured circuitry. In at least one embodiment, the processing circuitry 46 comprises one or more microprocessors, microcontrollers, Digital Signal Processors (DSPs), Field Programmable Gate Arrays (FPGAs), Application Specific Integrated Circuits (ASICs), or other digital processing circuitry that is/are specially adapted to carry out the operations described herein for the charging system node 30, based on the execution of computer program instructions.

Correspondingly, the processing circuitry 46 includes or is associated with storage 48, e.g., for storing the computer program instructions as one or more computer programs 50 and storing one or more items of configuration data 52. The storage comprises one or more types of computer-readable media, such as working memory for "live" operation of the charging system node 30 and program or long-term memory or other storage, for longer-term retention of the computer program(s) 50 and configuration data 52. Examples include any one or more of SRAM, DRAM, FLASH, Solid State Disk (SSD), EEPROM, and magnetic storage media.

Taking these example details, a contemplated charging system node 30 is configured for operation in a charging system 20 associated with a communication network 10 and includes communication interface circuitry 40 that is configured for communicatively coupling the charging system node 30 to one or more other nodes of the charging system 20. The charging system node 30 further includes processing circuitry 46 that is operatively associated with the communication interface circuitry 40. "Operatively associated" means, among other things, that the processing circuitry 46 uses the communication interface circuitry 40 to exchange information with one or more external processing entities, e.g., in other nodes or functions within the charging system 20.

The processing circuitry 46 is configured to record consumption control information in a parent data container 34 that is common to a plurality of user devices 12 that share a subscription 32 for using the communication network 10. The consumption control information commonly governs consumption by each of the user devices 12 of "units" that represent corresponding quanta of metered use of a communication service provided via the communication network 10. Further, the processing circuitry 46 is configured to record individual consumption information for each user device 12 in a correspondingly created child data container 36 that is specific to the user device 12. The individual consumption information reflects unit consumption by the user device 12 that is subject to the consumption control information in the parent data container 34.

For charging-system operations that involve only the consumption control information, the processing circuitry 46 is configured to access the parent data container 34 without accessing any child data container 36. For charging-system operations involving unit consumption by a particular one of the user device 12 that is governed by the consumption control information, the processing circuitry 46 is configured to form a non-persistent working data container 80, track the unit consumption in the working data container 80, along with holding the consumption control information in the working data container 80 to govern the unit consumption, and, in conjunction with releasing the working data container 80, update the individual consumption information recorded in the corresponding child data container 36, according to the tracked unit consumption.

A non-limiting, example context for the operations set out for the charging system node 30 involve deployments of potentially large populations of user devices 12 commonly sharing a subscription, as might be done with large populations of Machine Type Communication (MTC) or Internet-of-Things (IoT) devices, as the user devices 12. IoT deployments may involve thousands or tens of thousands of devices, or more.

In an example scenario, each user device 12 belonging to a given population links to a common subscription that provides or allows a set amount of service consumption per device per subscription period. Carrying the validity period and other consumption-control information in consolidated data containers 2, such as shown in FIG. 1, obligates the charging system 20 to store such information for each user device 12 in the population, which may be hundreds of thousands, or even millions of devices. With the consumption-control information stored for each user device 12 in the population, the charging system 20 must update all the involved consolidated data containers 2 every time the consumption-control information changes, e.g., when new consumption allowances are provided or the validity-time information changes, which may happen periodically in accordance with subscription details.

Contrastingly, using the bifurcated storage approach provided via the parent/child data containers 34 and 36 exemplified in FIG. 2, the charging system node 30 need access only a single data container, the parent data container 34, for changes affecting only the consumption control information—i.e., consumption allowances and validity times for governing relevant service consumption by each of the user devices 12 in the population associated with the parent data container 34. Further, for tracking and controlling service consumption by an individual user device 12 in the population, the charging system node 30 advantageously uses information in the parent data container 34 and the corresponding child data container 36. This approach avoids redundant storage of common information in the child data containers 36, dramatically reduces the retrieval and storage operations needed to update the consumption-control information, and still allows "normal" merged use of the consumption-control information and per-device tracked consumption information for use in authorizing and limiting service consumption by individual user devices 12.

The consumption control information comprises, for example, a consumption allowance that provides for the consumption of a defined number of units by each of the user devices 12, and the individual consumption information recorded for any of the user devices 12 that consumes units subject to the consumption allowance indicates a cumulative consumption or a remaining consumption allowance. Again, the "units" in this context may be monetary or non-monetary units and they may relate or translate into "service units" representing the quanta used for metering consumption of the communication service in question according to a rating function that may use any number of variables when determining the "cost" of service consumption in terms of the units provided or allowed by the consumption control information in the parent data container 34.

In an example implementation, the consumption allowance stored in the parent data container 34 is one of two or more consumption allowances. Correspondingly, the individual consumption information for any of the user devices 12 that consumes units subject to any of the two or more consumption allowances indicates the consumption on a per consumption allowance basis. The two or more consumption allowances cover the same communication service, for example, but have different unit allowances or limits for governing consumption or have different validity information. As one example, the subscriber associated with the subscription 32 purchases two or more "product offerings" from the network operator, with each product offering providing a certain amount of units as "credits" against service consumption and with each product offering setting a different validity window for consumption of the credited units.

To enable the tracking of per-device consumption against specific consumption allowances provided in the parent data container 34, each consumption allowance in the consumption control information stored in the parent data container 34 has a corresponding identifier. The individual consumption information recorded in the corresponding child data container 36 for any particular user device 12 is subdivided on a per identifier basis. Further, in at least one embodiment, for each consumption allowance in the consumption control information, the consumption control information further comprises a corresponding validity time that defines a window or deadline restricting the consumption of units that are subject to the consumption allowance.

The processing circuitry 46 in one or more example implementations is configured to create the child data container 36 for any particular one of the user devices 12 on an as-needed basis. Here, a child data container 36 is needed to track any unit consumption that is subject to the consumption control information, by any particular one of the involved user devices 12. Consider an example case where the consumption control information in the parent data container 34 provides for a set amount of consumption by each of the user devices 12, within a defined validity period. No child data containers 36 are needed for any user devices 12 that have no relevant service consumption.

As earlier noted, a non-limiting but advantageous example involves a scenario where the user devices 12 in question are a plurality of IoT devices sharing the same subscription 32. In a further extension of the example, the consumption control information comprises a periodic credit allocation, as a consumption allowance, that allows each IoT device a defined amount of usage of the communication network 10. The consumption allowance is a credit allocation comprising a credited number of units, and the processing circuitry 46 is configured to refresh the periodic credit allocation by accessing only the parent data container 34. For governing consumption by each IoT device, the processing circuitry 46 is configured to authorize usage of the communication network 10 by the IoT device in dependence on verifying that the periodic credit allocation in the parent data container 34 is valid for the current period, and further in dependence on verifying that the IoT device has remaining units from the credited number of units for the current period, as determined from the individual consumption information recorded for the IoT device in the corresponding child data container 36.

To govern the consumption by any particular IoT device among the plurality of IoT devices, the processing circuitry 46 is configured to form a temporary consolidated data container from the parent data container and the child data container of the particular IoT device, with this temporary consolidated data container also referred to as a "working data container" or "merged data container". The processing circuitry 46 is configured to operate on the temporary consolidated data container for rating and authorizing usage of the communication network 10 by the particular IoT device in a current communication session, and save updated consumption information from the temporary consolidated data container to the child data container 36 of the particular device for persistent storage, upon termination of the current communication session.

Figure 3:
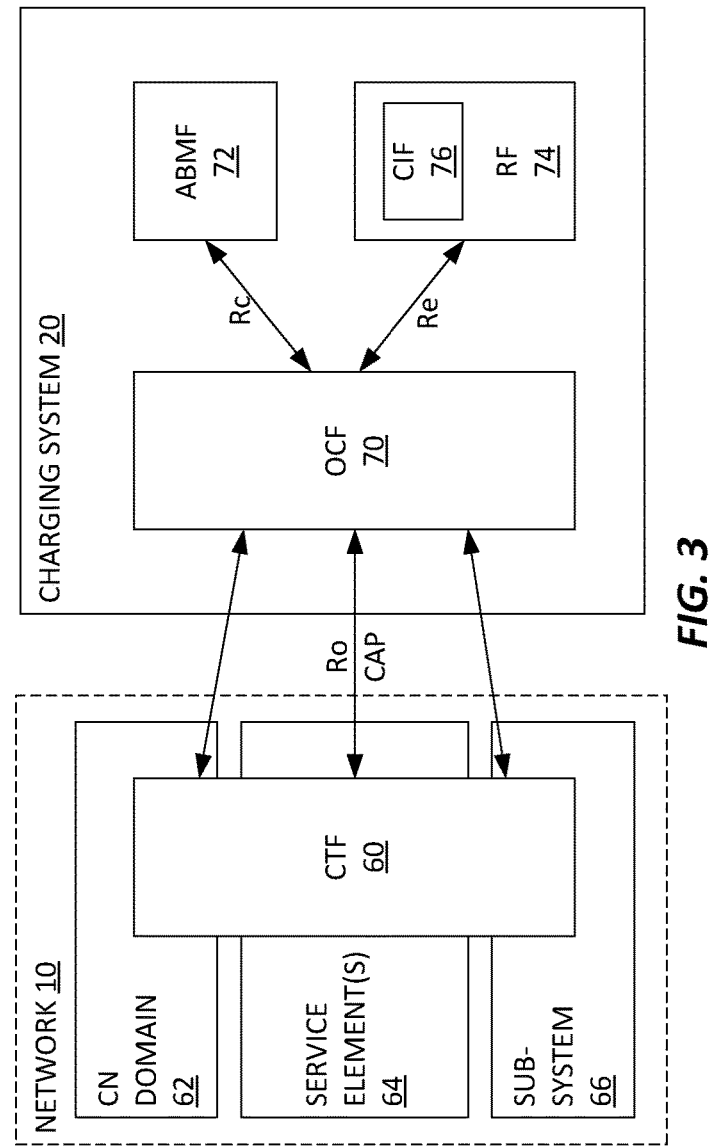
FIG. 3 is a block diagram of example details for a charging system and associated charging-related entities in a communication network.

FIG. 3 illustrates an example implementation of the charging system 20 with interfaces to the communication network 10. As for detecting communication-service usage or attempts at usage authorization, the communication network 10 in an example embodiment comprises one or more Core Network (CN) domains 62 (e.g., an Evolved Packet Core or EPC), one or more service elements 64 (e.g., to provide Multimedia Services), and one or more subsystems 66 (e.g., an IP Multimedia Subsystem). These various entities have associated Charging Trigger Functions (CTFs) 60 as integrated components, for collecting information pertaining to chargeable events and sending charging events for user devices 12 that are linked to one or more subscriptions 32. Correspondingly, the charging system node 30 may receive signaling from the CTFs 60, or signaling corresponding thereto, e.g., via one or more Online Charging Functions (OCFs) 70.

The charging system 20 further includes, in the example illustration, an account balance management function (ABMF) 72, a rating function (RF) 74, and a charging interrogation function (CIF) 76 that is associated with the RF 74. Here, the word "function" denotes functionality instantiated in a networked computer server or in other processing circuitry. In at least one example, the contemplated charging system node 30 operates as the ABMF 72 and/or as the OCF 70 associated therewith.

Though the functional requirements for charging are broadly consistent across the various domains, services and subsystems, the reference point(s) between the CTF 60 and the OCF 70 depends on the domain, service, or subsystem involved in detecting communication-service usage. For example, a Circuit Switched (CS) domain uses CAMEL (Customized Applications for Mobile networks Enhanced Logic) as a reference point, whereas an IP Multimedia Subsystem (IMS) uses "Ro" as reference point between the CTFs 60 and the OCF 70. For Diameter Charging Control (DCC), see IETF RFC 4006 and 3GPP TS 32.299 V8.9.0 (2009 December), the latter of which describes standardized interfaces between CTFs 60 and the OCF 70. Such interfaces may be used to "carry" charging-related signaling between the CTFs 60 and OCF 70. For further details regarding example charging architectures and principles associated with operation and interfacing of the CTFs 60, OCF 70, and the charging system node in general, see 3GPP TS 32.240 V16.0.0 (2019 March).

In FIG. 3 and in a broader context, the charging system node 20 described herein may be implemented as a single node or may have its functionality distributed across two or more nodes, e.g., across two or more "functions" implemented via the charging system 20. Implementation flexibility extends to virtualization, involving instantiation of the charging system node 30 using virtualized processing resources on one or more host computing platforms.

Figure 4:
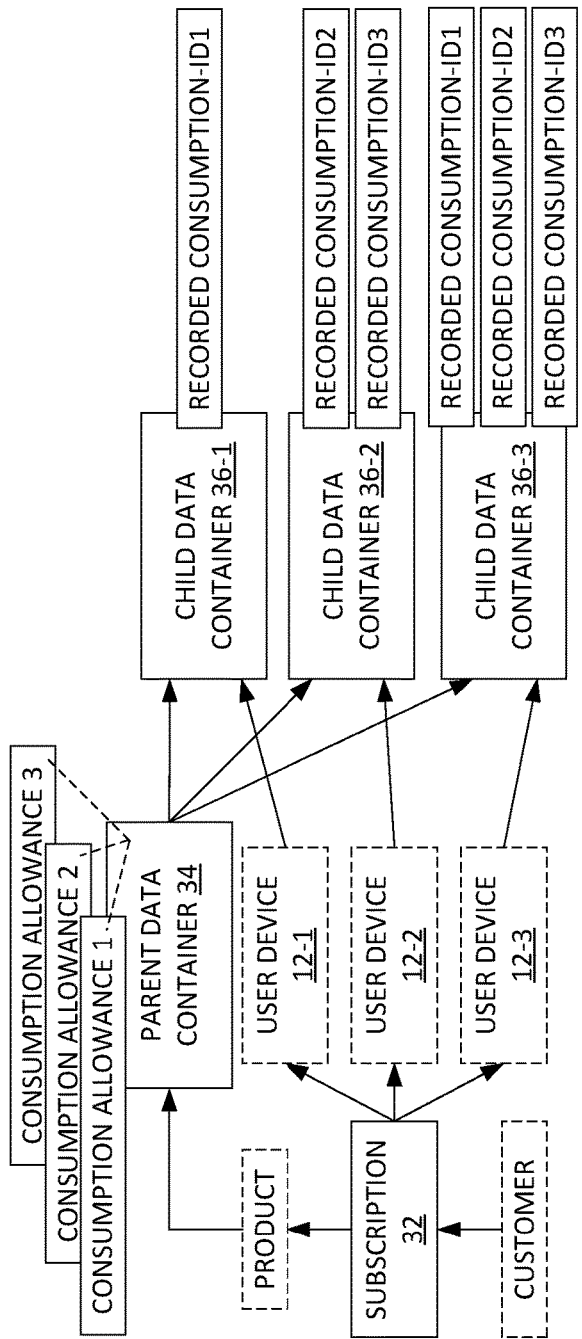
FIG. 4 is a diagram of an example data structure and linking, for implementation and use of parent and child data containers to control and track service consumption by individual user devices governed by common consumption control.

FIG. 4 illustrates an example arrangement of the logical structure and associations between a "customer" and a subscription 32, and between the subscription 32 and a parent data container 34 and respective child data containers 36, with each child data container 36 corresponding to a respective user device 12, which may be an IoT device as one example. For simplicity, the illustrated "group" or "population" of user devices 12 includes three user devices 12-1, 12-2, and 12-3, with corresponding child data containers 36-1, 36-2, and 36-3. Of course, a child data container 36 may not be created until needed.

Each child data container 12 logically links to the parent data container 34, which for example purposes includes a consumption allowance, e.g., a credit allowance of a defined number of units or a consumption limit that limits the total number of units that can be consumed within a validity period. While the diagram depicts the parent data container 34 as containing three consumption allowances 1, 2, and 3, the different consumption allowances may, in fact, be different "instances" of the same consumption allowance. Each "instance" has, for example, different validity information, such as different validity windows or expirations. Following this approach, distinct or independent "consumption allowances" may be handled in different parent containers 34, with corresponding sets of child data containers 36.

In the diagram, each instance of the consumption allowance is a units credit, e.g., a credit allowance comprising a certain number of units as credit towards consumption by each of the user devices 12. In another example, each consumption allowance is a consumption limit, e.g., expressed as an upper limit on the number of units that can be consumed by each of the user devices 12. Generally, the instances of the consumption allowances within a parent data container 34 are of the same type, e.g., they are all different instances of a credit allowance, or they are all different instances of a consumption limit.

Each consumption allowance 1, 2, and 3 may have a locally unique identifier, e.g., ID1 for consumption allowance 1, ID2 for consumption allowance 2, and ID3 for consumption allowance 3. The identifiers provide a mechanism for tracking related service consumption by the individual user devices 12-1, 12-2, and 12-3 in their respective child containers 36-1, 36-2, and 36-3. In the example illustration, the user device 12-1 has engaged in communication services chargeable or otherwise trackable against the consumption allowance 1 and its child data container 36-1 correspondingly contains recorded consumption information tagged with ID1. Along the same lines, the user device 12-2 has engaged in communication services chargeable or otherwise trackable against the consumption allowances 2 and 3, respectively, and its child data container 36-2 correspondingly contains respective recorded consumption information tagged with ID2 and respective recorded consumption information tagged with ID3. The user device 12-3 has engaged in communication services chargeable or otherwise trackable against the consumption allowances 1, 2, and 3, respectively, and its child data container 36-3 correspondingly contains respective recorded consumption information tagged with ID1, respective recorded consumption information tagged with ID2, and respective recorded consumption information tagged with ID3.

FIG. 4 also indicates that in one or more embodiments, the consumption allowances 1, 2, and 3 may be associated with one or more "product offerings". A "product offering" is an agreed or defined amount of service, for example, offered on an agreed price or promotional basis, and is provided by the network operator to the customer associated with the subscription. There may be one consumption allowance per product offering or there may be more than one consumption allowance provided under a single product offering.

Figure 5:
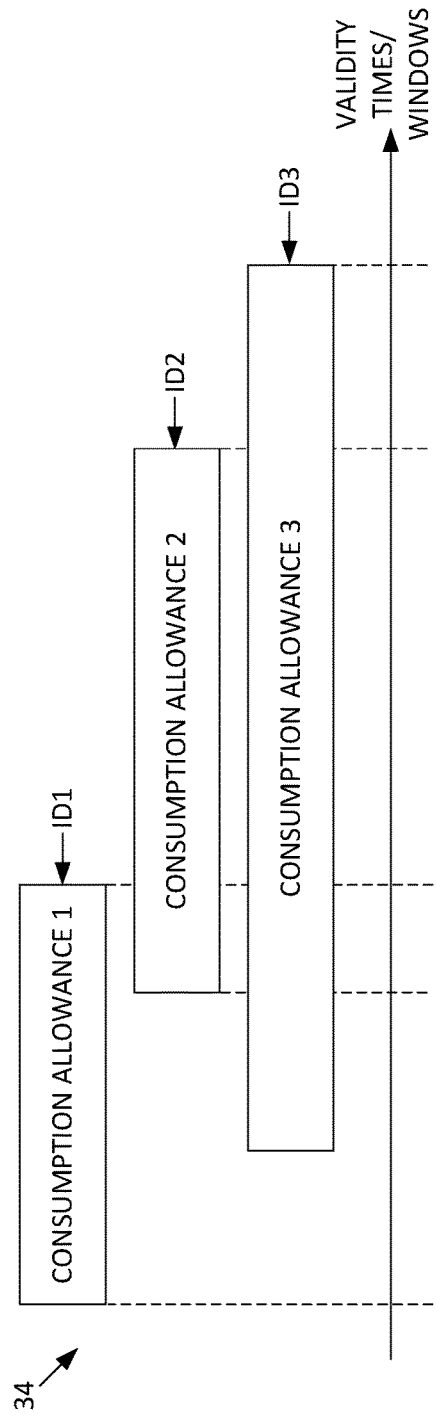
FIG. 5 is a diagram of example parent data container and included consumption control information.

FIG. 5 offers additional details for the respective consumption allowances 1, 2, and 3, depicting each consumption allowance as having corresponding validity information, such as a corresponding validity window or time. The respective validity times may overlap, meaning that service consumption by a particular user device 12 may be tracked against a particular consumption allowance among two or more consumption allowances that are valid for the involved time of consumption. Selection of which consumption allowance the service consumption is tracked against depends on one or more variables.

For example, in FIG. 5, a first period of overlapping validity times involves all three consumption allowances 1, 2, and 3, and a second period of overlap involves the consumption allowances 2 and 3. Consumption recording may be prioritized such that consumption is tracked against the consumption allowance 1, provided that the user device 12 involved in the consumption has not exhausted the consumption allowance 1 and the consumption occurs within the validity time of the consumption allowance 1. Similar successive prioritizations may be used for determining which of two or more valid consumption allowances to select for tracking consumption by any particular user device 12 at any particular time.

Figure 6:
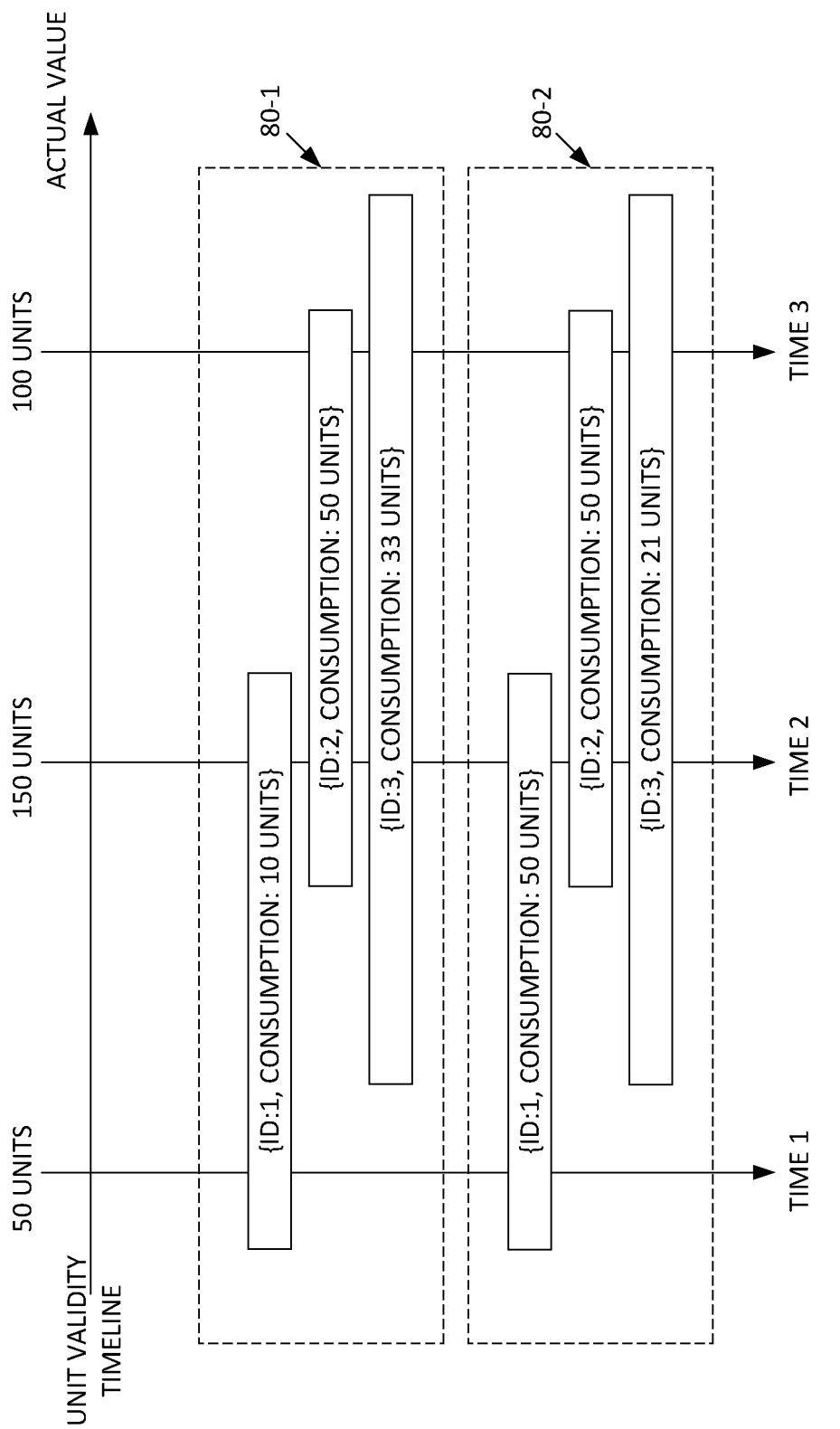
FIG. 6 is a diagram of temporary working data containers, each formed by temporarily merging information from a parent data container and a respective child data container.

FIG. 6 illustrates an advantageous "merging" of the consumption control information from the parent data container 34 with the tracked consumption information recorded in individual child data containers 36, to form a temporary consolidated data container 80. Referring to temporary consolidated data containers as "working data containers" emphasizes their transient nature, and FIG. 6 illustrates two working data containers 80-1 and 80-2. The working data container 80-1 corresponds, for example, to the user device 12-1, and the working data container 80-2 corresponds, for example, to the user device 12-2.

For example purposes, the tracked consumption information recorded in the working data container 80-1 includes 10 units of consumption for the consumption allowance 1 (ID1), 50 units of consumption for the consumption allowance 2 (ID2), and 33 units of consumption for the consumption allowance 3 (ID3). The tracked consumption information recorded in the working data container 80-2 includes 50 units of consumption for the consumption allowance 1 (ID1), 50 units of consumption for the consumption allowance 2 (ID2), and 21 units of consumption for the consumption allowance 3 (ID3).

Figure 7A:
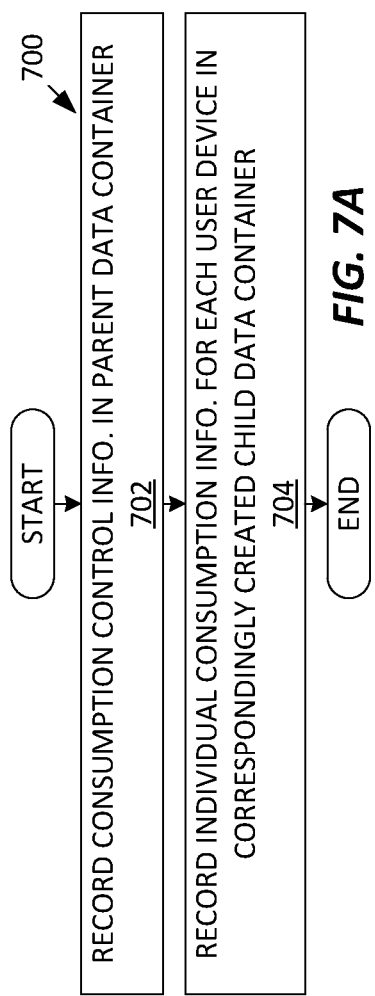

Assuming each consumption allowance 1, 2, and 3 comprises a credit allowance of 50 units, the total number of credited units available to each user device 12 depends on the time of consumption and whether or how the consumption allocations overlap. In the illustrated example, the consumption allowance 1 is the only consumption allowance—the only instance—that is valid, meaning that the total credit available at TIME 1 is 50 units. At TIME 2, all three consumption allowances 1, 2, and 3 overlap, meaning that the total number of credited units available to each user device 12 is 150. At TIME 3, the overlap of consumption allowances 2 and 3 provides a total credit allowance of 100 units. Of course, the remaining credit available to either user device 12-1 and 12-2 at any given time in this example scenario depends on how much of the consumption allowances 1, 2, and 3 have already been consumed by the user device FIG. 7A illustrates an example method 700 of operation by a charging system node 30, with the understanding that certain steps or operations may be performed in an order other than the one suggested by the depicted flow, and the further understanding that the method 700 may be performed in conjunction with other operations and may be repeated or performed in parallel, with respect to any one or more of different customers, different subscriptions 32, different product offerings, different populations of user devices 12, and different parent data containers 34.

At least with respect to a particular parent data container 34 and an associated population of user devices 12, the method 700 includes recording (Block 702) consumption control information in the parent data container 34 that is common to a plurality of user devices 12 that share a subscription 32 for using the communication network 10. The consumption control information commonly governs consumption by each of the user devices 12 of units that represent corresponding quanta of metered use of a communication service provided via the communication network 10.

In one or more example implementations, the consumption control information comprises at least one consumption allowance that establishes a consumption limit counted in units or provides a consumption credit counted in units. Further, in at least some cases, the consumption control information further includes validity information for each consumption allowance currently held in the parent data container 34, such as an expiration time or a validity window, e.g., a week, a month, or another defined window. The "recording" is triggered, for example, according to a periodic trigger, such as a monthly replenishment or is event-triggered, such as where the customer, also known as a "subscriber", associated with the involved subscription 32 buys or otherwise obtains a new consumption allowance for the population of user devices sharing the subscription 32.

The method 700 further includes recording (Block 704) individual consumption information for each user device 12 in a correspondingly created child data container 36 that is specific to the user device 12. The individual consumption information reflects unit consumption by the user device 12 that is subject to the consumption control information in the parent data container 34.

Figure 7B:
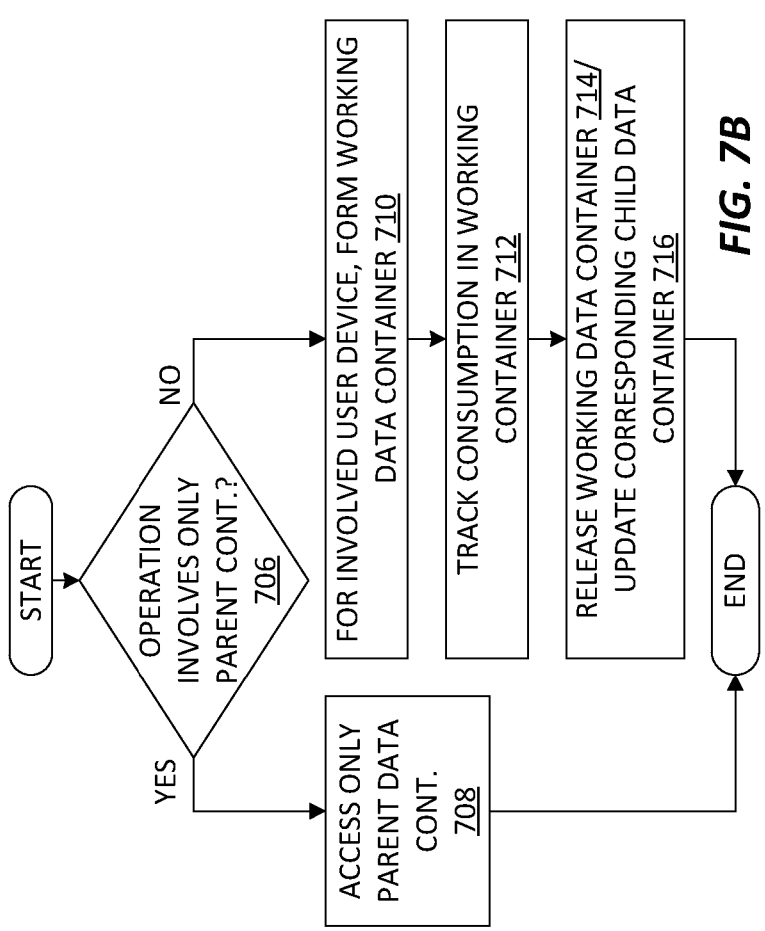

FIG. 7B provides further example details for carrying out various aspects of the method 700, including the recording operations 702 and 704 depicted in FIG. 7A. Those recording operations may be performed in response to or as part of various charging-system operations, such as replenishing consumption allowances in a parent data container 34, or accessing both the consumption control information in the parent data container 34 and tracked consumption information in a respective child data container 36, for service authorization and/or service-usage tracking.

As shown in FIG. 7B, for charging-system operations that involve only the consumption control information (YES from Block 706), the method 700 includes accessing (Block 708) the parent data container 34 without accessing any child data container 36. Eliminating the need to access per-device child data containers 36 for operations involving only the consumption control information yields significant reductions in signaling overhead, e.g., by reducing the number of data containers that need to be retrieved, updated, and then "persisted" in storage.

For charging-system operations involving unit consumption by a particular one of the user device 12 that is governed by the consumption control information (NO from Block 706), the method 700 includes forming (Block 710) a non-persistent working data container 80, tracking (Block 712) the unit consumption in the working data container 80, along with holding the consumption control information in the working data container 80 to govern the unit consumption, and, in conjunction with releasing (Block 714) the working data container 80, updating (Block 716) the individual consumption information recorded in the corresponding child data container 36, according to the tracked unit consumption.

In at least one implementation of the method 700, the method includes creating the child data container 36 for any particular one of the user devices 12 on an as-needed basis. The child data container 36 for a particular user device 12 is "needed" for example to track any unit consumption by the particular user device 12 that is subject to the consumption control information in the parent data container 34.

The plurality of user devices 12 is a plurality of IoT devices, for example, all sharing the same subscription 32, and the consumption control information comprises a periodic credit allocation, as a consumption allowance, that allows each IoT device a defined amount of usage of the communication network 10. The credit allocation is a credited number of units, and the method 700 in a corresponding implementation includes refreshing the periodic credit allocation by accessing only the parent data container 34. The method 700 in this example further includes governing consumption by each IoT device by authorizing usage of the communication network 10 by the IoT device in dependence on verifying that the periodic credit allocation in the parent data container 34 is valid for the current period, and further in dependence on verifying that the IoT device has remaining units from the credited number of units for the current period, as determined from the individual consumption information recorded for the IoT device in the corresponding child data container 36.

Such operations include, for example, forming a temporary consolidated data container 80 from the parent data container 34 and the child data container 36 of the particular IoT device, where the non-persistent working data containers 80-1 and 80-2 shown in FIG. 6 are examples of a temporary consolidated data container. The method 700 includes operating on the temporary consolidated data container 80 for rating and authorizing usage of the communication network 10 by the particular IoT device 12 in a current communication session, and saving updated consumption information from the temporary consolidated data container 80 to the child data container 36 of the particular device for persistent storage, upon termination of the current communication session.

The operations detailed in FIGS. 7A and 7B exemplify the broader technique disclosed herein for reducing the amount of data needed to keep track of usage for individual user devices 12, such as IoT devices. As a further advantage, the contemplated technique reduces the overhead of handling consumption-control and consumption tracking information for recurring actions. In part, the technique flows from the advantageous recognition that populations of IoT devices or other defined groups of user devices 12 may share the same properties. As an example, resetting or updating a credit allowance or other item of consumption-control information commonly applies to all user devices 12 governed by the consumption-control information.

The technique exploits this fact by separating or bifurcating the consumption control information that commonly applies to each user device 12 in the involved population from the per-device consumption tracking. The bifurcation results in a parent data container 34 that holds the commonly-applicable information, such as consumption allowances and corresponding validity times, and individual child data containers 36 that hold the device-specific consumption tracking information.

Going back to FIGS. 4 and 5 momentarily, the consumption allowances and corresponding validity times that comprise the consumption control information applicable to a population of user devices 12 resides in a parent data container 34 that commonly links to per-device child data containers 36, which hold per-device tracked consumption information. Among other things, the bifurcation means that the individual child data containers 36 need not be created and maintained for a user device 12 unless or until the user device 12 becomes active or otherwise consumes a service that is trackable against the consumption control information held in the parent data container 34. Further, replenishing a credit allowance or otherwise updating consumption control information that commonly applies to a population of user devices 12 that share a subscription 32 requires manipulation of only the parent data container 34, despite the fact that the change applies to the entire population of user devices 12, which may be tens or hundreds of thousands of devices, or even millions of devices. Any updates to the parent data container 34 are then accounted for or reconciled for when operating on individual ones of the child data containers 36.

Further, as noted, when working with an individual child data container 36, the charging system node 30 combines or otherwise merges the consumption control information from the parent data container 34 with the consumption tracking information in the child data container 36 to form a non-persistent working data container 80 that includes all of the information needed to authorize initial or continued usage of a communication service by the involved user device 12, and to record service consumption by the user device 12, e.g., by debiting a unit allowance or accumulating a unit usage. Advantageously, the working data container 80 exists only during use, e.g., during an active communication session.

Figure 8:
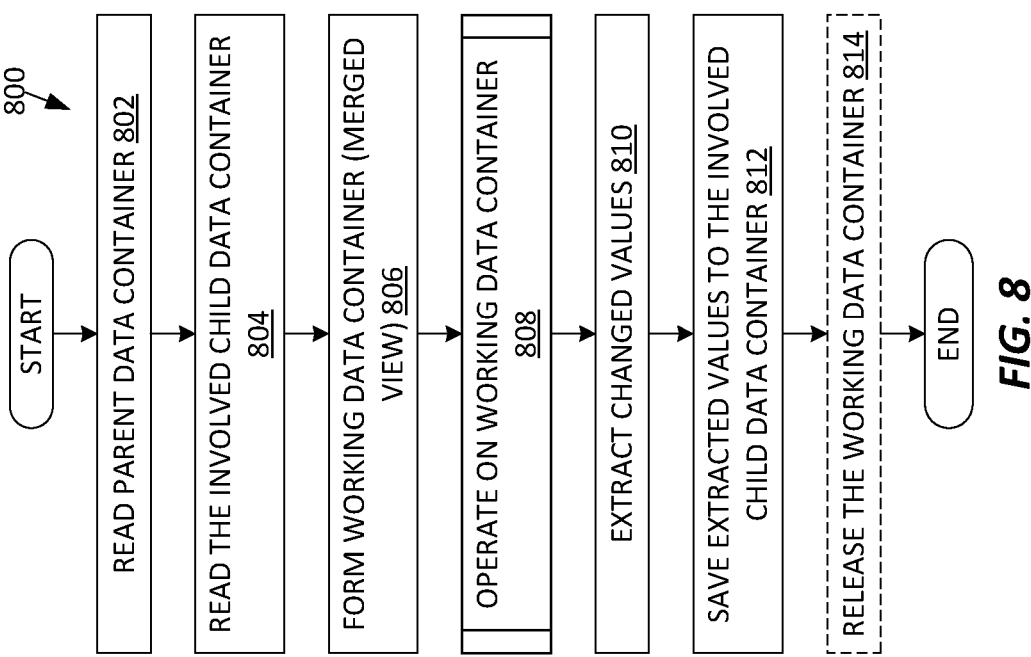
FIGS. 7A, 7B, 8 and 9 are logic flow diagrams of example methods of operation by a charging system node.

FIG. 8 illustrates a method 800 for working-container creation and use, where the method includes reading (Block 802) the involved parent data container 34 from persistent storage and reading (Block 804) the involved child data container 36 from persistent storage. Operations continue with forming (Block 806) a working data container 80 that merges information from the parent and child data containers 34 and 36, to provide a consolidated view or dataset for the charging system 20 to use for charging-related operations involving the user device 12 corresponding to the child data container 36. Merging includes populating the tracked consumption information in the working data container 80 using the current (last stored) tracked consumption information held in the child data container 36, as fetched from persistent storage.

The charging system 20 uses the working data container 80 to carry out one or more charging operations (Block 808)—such as service authorization for a communication service to be established or continued, subject to the consumption limits and tracked consumption information held in the working data container 80. Operating on the working data container changes one or more values for example, such as changes to remaining unit allowances or accumulated unit usage as tracked consumption information, and the method 800 includes extracting (Block 810) the changed values, for saving (Block 812) to the child data container 36 in persistent storage, and the method 800 concludes with releasing (Block 814) the working data container 80, e.g., removing it as a logical entity from the working memory or run-time environment used by the charging system 20 and thereby freeing those resources for other use.

Figure 9:
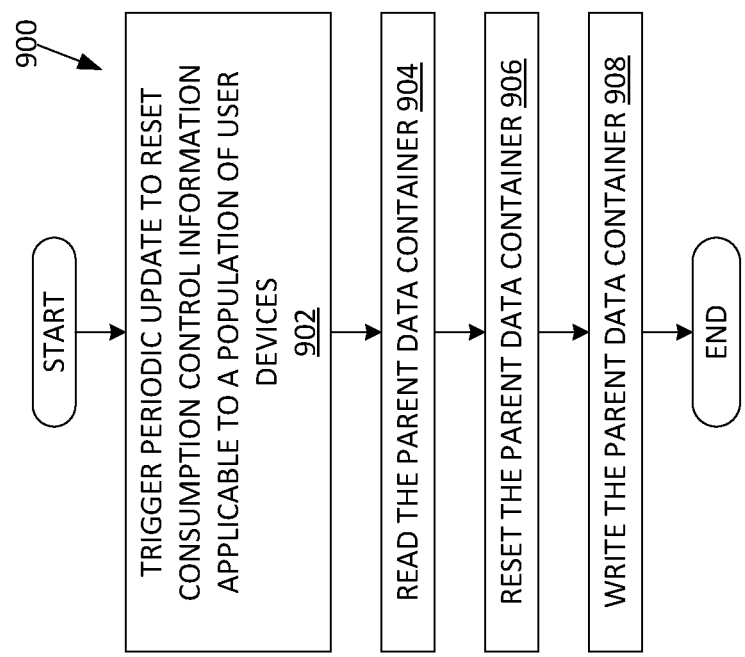

A periodic reset or other update to the consumption control information requires accessing and manipulating only the involved parent data container 34, irrespective of the number of user devices 12 that are in the affected population. FIG. 9 illustrates these advantageous operations in the form of an example method 900 that includes triggering (Block 902) a periodic update to reset consumption control information applicable to a population of user devices 12, reading (Block 904) the applicable parent data container 34, resetting (Block 906) the parent data container 34, and writing (Block 908) the parent data container 34.

"Resetting" the parent data container 34 comprises, for example, resetting one or more consumption allowances stored in the parent data container 34, e.g., by any one or more of resetting validity-time information, resetting a credit allowance, or resetting a consumption threshold. "Writing" the parent data container 34 comprises writing the parent data container, including any updates to the consumption control information held therein, back to persistent storage. In a further example of "resetting" a parent data container 34, resetting means creating a new consumption allowance. Further, to maintain a timeline of the parent data container 34, an existing or prior consumption allowance is not reset or removed and instead is "end dated" and a new consumption allowance is created with a new validity.

Maintaining all consumption allowances in the parent data container 34 in this fashion provides for handling requests with dates in the past.

Figure 10:
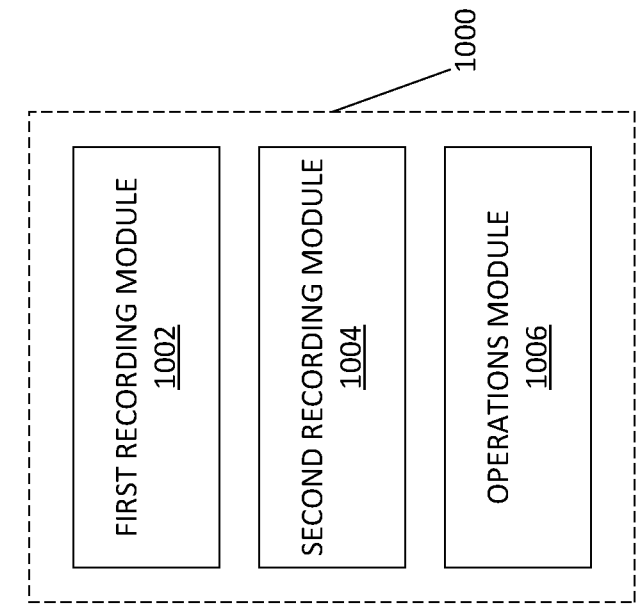
FIG. 10 is a block diagram of a charging system node, according to another example.

FIG. 10 illustrates another example implementation of a charging system node 30, as a collection of processing modules or processing units 1000, such as may be realized via the programmatic configuration of one or more processing circuits, which may comprise virtualized processing circuits—i.e., a virtual machine instantiated on a host computer server. The processing modules 1000 include a first recording module 1002 that is configured to record information in a parent data container 34, e.g., according to the relevant details in any of FIGS. 7A, 7B, 8, and 9. The processing modules 1000 further include a second recording module 1004 that is configured to record information in a child data container 36, e.g., according to the relevant details in any of FIGS. 7A, 7B, 8, and 9. Still further, the processing modules 1000 include an operations module 1006 that is configured to operate on parent and child data containers 34 and 36, including forming working data containers 80, as needed, e.g., according to the relevant details in any of FIGS. 7A, 7B, 8, and 9.

Consider a corporation or other enterprise that has an agreement with a network operator for a large number of mobile phones as an example population of user devices 12. The involved subscription 32 allows a certain amount of data per month, for each of the mobile phones. The data allocations occur as periodic adjustments made at the beginning of each subscription period or defined quota interval, such as the beginning of each month. Per agreed details, when a given one of the phones exceeds the data allowance within the current period, the mobile phone can only use voice service for the rest of the period. That is, data service is not permitted under the subscription 32, for the remainder of the current period.

An attempt to authorize data service for the mobile phone involves forming a corresponding working data container 80 based on merging the parent data container 34 with the involved child data container 36, and then checking the tracked consumption, as tracked for the current period, against the applicable consumption allowance indicated by the information merged from the parent data container 34. If the remaining permissible consumption, as expressed in remaining units in a credit allowance or against a maximum consumption threshold, is insufficient to cover the requested data-service consumption, the request is rejected.

Consider another example where an energy supplier has an agreement with a network operator for a potentially large number of smart meters as an example population of user devices 12. A working smart meter consumes an anticipated number of units per month. By accumulating the consumption per meter in respective child data containers 36, the charging system 20 provides valuable data for supervising and troubleshooting the meters. For example, over- or under-consumption of data by any meter in the population triggers a report or other event. Here, while the charging system 20 in one or more implementations may be configured to trigger or act on such events in other implementations, the charging system 20 makes the tracked consumption information available to downstream billing systems or other entities, such as a computer server controlled by the subscriber, here, the energy company.

Figure 11:
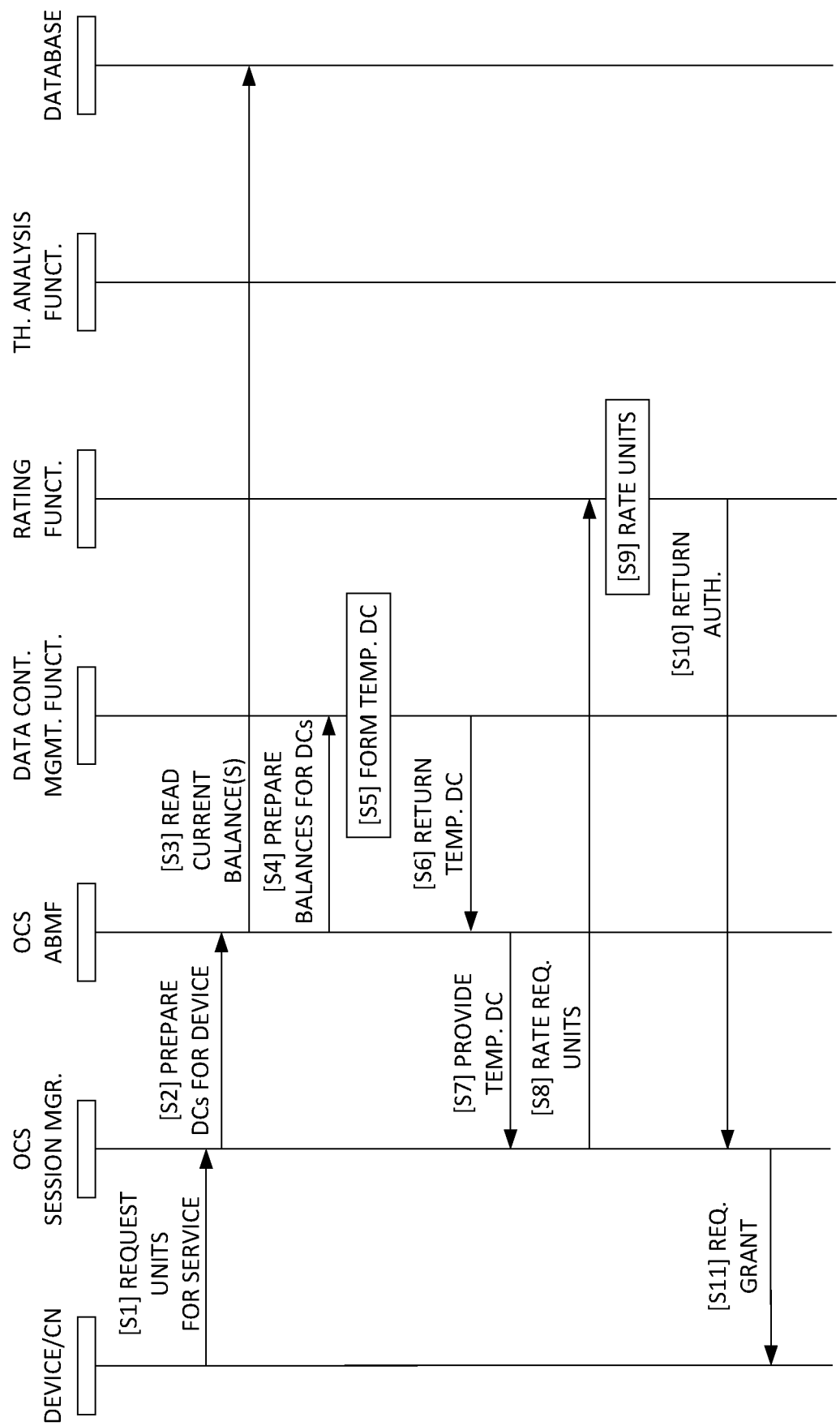
FIG. 11 is a signal flow diagram of an example service authorization procedure using parent and child data containers.

FIG. 11 provides an example signal flow illustrating the advantageous use of parent and child data containers 34 and 36 to form working data containers 80, e.g., for service authorization as an example charging-system operation.

At step S1, a user device 12 makes a connection request to the charging system 20 through the core network 18, which may be referred to as an Online Charging System or OCS for brevity. A "session manager" function in the OCS responds to the request by determining the number of units to grant (called "requested units"), and, at step S2, the OCS session manager sends a request to an OCS ABMF, requesting the ABMF to fetch the relevant parent and child data containers 34 and 36 and prepare a corresponding working data container 80 for use. At step S3, the ABMF fetches the involved parent data container 34 and the involved child data container 36 from persistent storage—e.g., from a database (DB). These operations include the OCS ABMF reading the current unit balances for the involved user device 12, as reflected in the tracked consumption information stored in the child data container 36 fetched for the user device 12.

The ABMF at step S4 uses a data container management function, which may be integral to the ABMF or may be an associated function, to prepare the applicable balances, i.e., to form the working data container 80 as step S5, using the current tracked consumption information for the user device 12 and the applicable consumption control information from the parent data container 34. The data container management function returns the working data container 80 to the ABMF at Step S6.

At step S7, the ABMF provides the working data container 80 to the session manager, for use in handling the service request. At step S8, the session manager communicates with a rating function, to rate the requested units. The rating function performs the requested rating at step S9 and returns, as step S10, an indication of the number of units authorized. The session manager uses the return information from the rating function to send an authorization grant at step S11. More generally, the session manager sends a request response that indicates the number of units that were authorized, which may be zero. Here, it should be understood that the "units" of the consumption allowance may or may not be the same type of "units" by which the involved communication service is metered, and the rating function may convert or translate between the units represented in the parent data container 34 and the metered service units. In other instances, the unit types are the same, e.g., where the consumption allowance is expressed in quanta of data consumption and metering of the communication service uses the same quanta.

Figure 12A:
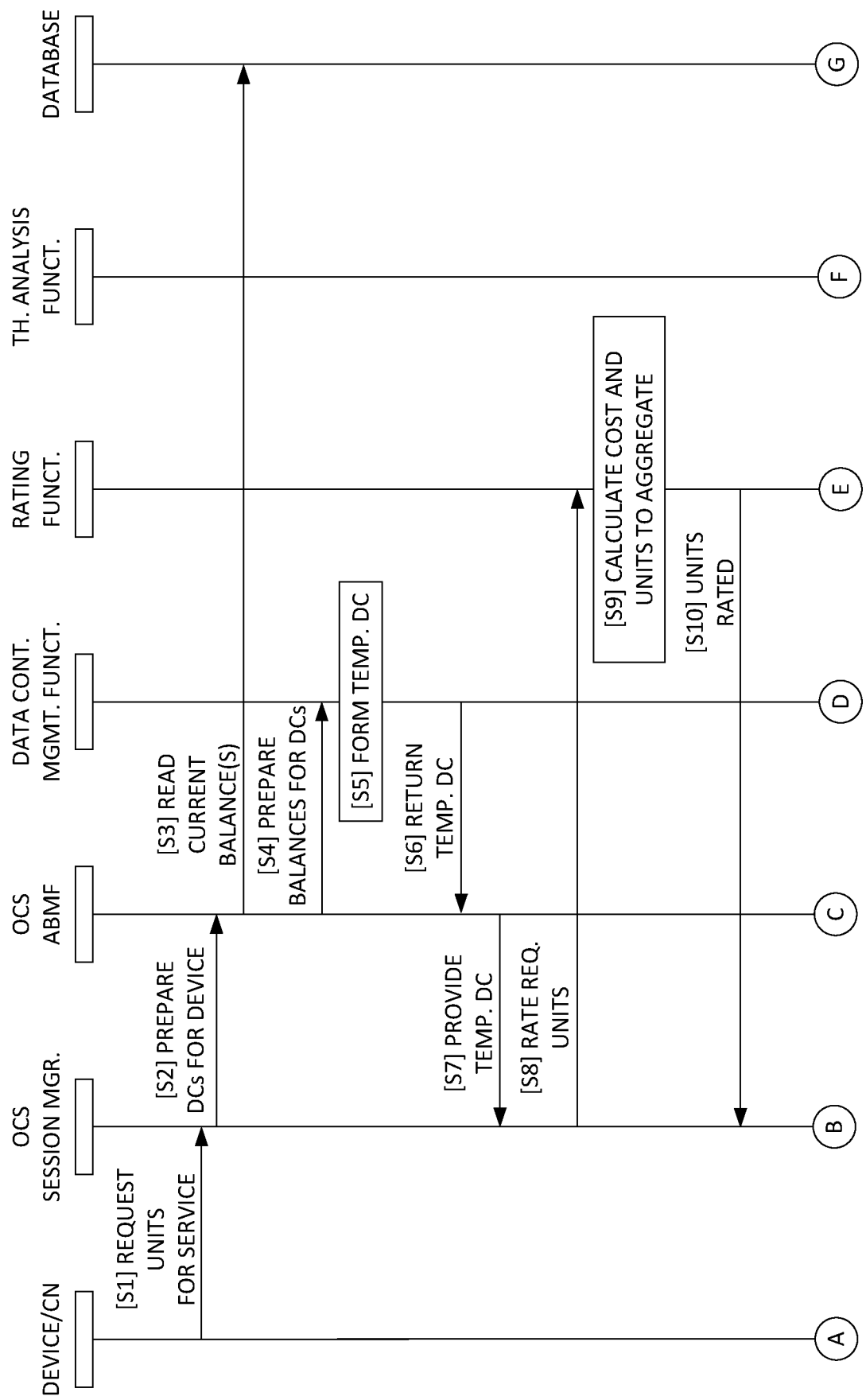
FIGS. 12A and 12B are a signal flow diagram of example service-consumption tracking using parent and child data containers.
Figure 12B:
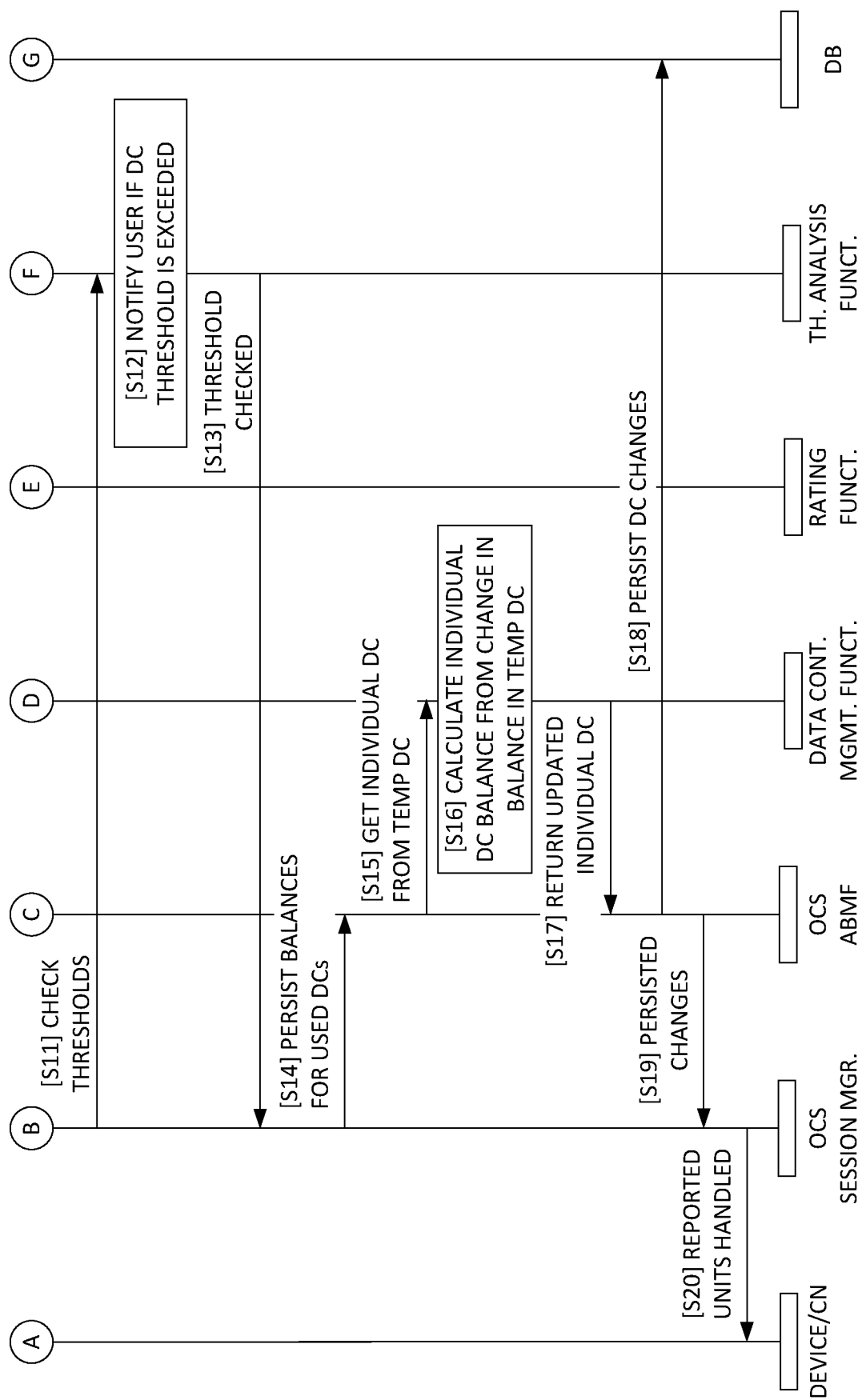

FIGS. 12A and 12B illustrate another example signaling flow, with a focus on usage tracking—consumption recording in a child data container 36. Steps S1-S10 are as described above. Taking the rating operations in more detail, however, the number of units requested for rating are acted on by the rating function, which uses configured rules to calculate the cost of the used units. Rating also uses rules to decide to which consumption allowances to aggregate or use, from the consumption allowances available from the parent data container 34. Once the rating calculations are done, the rating function returns the results of the rating calculations to the session manager.

The session manager at step S11 communicates with a Threshold Analysis Function (TAF) to trigger a threshold analysis. The request contains a list of all changed consumption information, e.g., as reflected by updating the working data container 80 to account for the rated units, and the TAF checks the changed consumption in the working data container 80 against one or more configured thresholds. If a threshold has been passed, corresponding configured actions are triggered as step S12, such as notifying the user device 12. At step S13, the TAF indicates completion of the threshold checking and, at least on the checks being passed, the session manager at step S14 sends an indication to the ABMF, indicating that the tracked consumption information for the user device 12 should be updated to reflect the rated units.

Steps 15-17 provide the delta values—changes to tracked consumption information—that should be persisted in the involved child data container 35. In these operations, the ABMF cooperates with the data container management function to translate the rated units into revised tracked consumption information for the user device 12—i.e., to change the tracked consumption information to reflect the rated units as consumption against the specific consumption allowance or allowances used by the rating operations. Upon completion of those operations, the ABMF persists the data container ("DC") changes at step S18, by writing the changes into the child data container 36, as held in persistent storage. At step 19, the ABMF indicates the changes to the session manager, and the session manager at step S20 reports the number of units handled, e.g., to the CN 18.

The ABMF at step S15 requests the data container management function to extract the changed information from the working data container 80 and, at step S16, the data container management function extracts the updated tracked consumption information from the working data container 80 and writes it to the child data container 36, for persistent storage. In these operations, the session manager operates as a session/request orchestrator. The orchestrator calls different services in the charging system to process the service request. That is, a client function requests an amount of units, which is granted, if possible (see FIG. 11). When the units later have been used, all or partly (FIGS. 12A/B), they will be reported as used units. Deduction is done after they have been used. Requested units may be reserved so no other service session can use them, but the real, tracked balance of units remains unchanged until the deduction of consumed units.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation performed by a charging system node of a charging system associated with a communication network, the method comprising:

recording consumption control information in a parent data container that is common to a plurality of user devices that share a subscription for using the communication network, the consumption control information commonly governing consumption by each of the user devices of units that represent corresponding quanta of metered use of a communication service provided via the communication network; and recording individual consumption information for each user device in a correspondingly created child data container that is specific to the user device, the individual consumption information reflecting unit consumption by the user device that is subject to the consumption control information in the parent data container;

wherein, for charging-system operations that involve only the consumption control information, the method includes accessing the parent data container without accessing any child data container;

wherein, for charging-system operations involving unit consumption by a particular one of the user device that is governed by the consumption control information, the method includes forming a non-persistent working data container, tracking the unit consumption in the working data container, along with holding the consumption control information in the working data container to govern the unit consumption, and, in conjunction with releasing the working data container, updating the individual consumption information recorded in the corresponding child data container, according to the tracked unit consumption; and wherein the plurality of user devices are sharing the same subscription, wherein the consumption control information comprises a periodic credit allocation, as a consumption allowance, that allows each user device a defined amount of usage of the communication network, wherein the credit allocation is a credited number of units, wherein the method includes refreshing the periodic credit allocation by accessing only the parent data container, and wherein governing consumption by each user device comprises authorizing usage of the communication network by the user device in dependence on verifying that the periodic credit allocation in the parent data container is valid for the current period, and further in dependence on verifying that the user device has remaining units from the credited number of units for the current period, as determined from the individual consumption information recorded for the user device in the corresponding child data container.

2. The method of claim 1, wherein the consumption control information comprises a consumption allowance that provides for the consumption of a defined number of units by each of the user devices, and wherein the individual consumption information recorded for any of the user devices that consumes units subject to the consumption allowance indicates a cumulative consumption or a remaining consumption allowance.

3. The method of claim 2, wherein the consumption allowance is one of two or more consumption allowances, and wherein the individual consumption information for any of the user devices that consumes units subject to any of the two or more consumption allowances indicates the consumption on a per consumption allowance basis.

4. The method of claim 2, wherein each consumption allowance in the consumption control information has a corresponding identifier, and wherein the individual consumption information recorded for any particular user device is subdivided on a per identifier basis.

5. The method of claim 2, wherein, for each consumption allowance in the consumption control information, the consumption control information further comprises a corresponding validity time that defines a window or deadline restricting the consumption of units that are subject to the consumption allowance.

6. The method of claim 1, wherein the method includes creating the child data container for any particular one of the user devices on an as-needed basis, where the child data container is needed to track any unit consumption by the particular user device that is subject to the consumption control information.

7. The method of claim 1, wherein the plurality of user devices is a plurality of Internet-of-Things (IoT) devices.

8. The method of claim 7, wherein, to govern the consumption by any particular IoT device among the plurality of IoT devices, the method includes forming a temporary consolidated data container from the parent data container and the child data container of the particular IoT device, operating on the temporary consolidated data container for rating and authorizing usage of the communication network by the particular IoT device in a current communication session, and saving updated consumption information from the temporary consolidated data container to the child data container of the particular device for persistent storage, upon termination of the current communication session.

9. A charging system node configured for operation in a charging system associated with a communication network, the charging system node comprising:
  communication interface circuitry configured for communicatively coupling the charging system node to one or more other nodes of the charging system; and
  processing circuitry operatively associated with the communication interface circuitry and configured to:
    record consumption control information in a parent data container that is common to a plurality of devices that share a subscription for using the communication network, the consumption control information commonly governing consumption by each of the user devices of units that represent corresponding quanta of metered use of a communication service provided via the communication network;
    record individual consumption information for each user device in a correspondingly created child data container that is specific to the user device, the individual consumption information reflecting unit consumption by the user device that is subject to the consumption control information in the parent data container;
    for charging-system operations that involve only the consumption control information, access the parent data container without accessing any child data container; and
    for charging-system operations involving unit consumption by a particular one of the user device that is governed by the consumption control information, form a non-persistent working data container, track the unit consumption in the working data container, along with holding the consumption control information in the working data container to govern the unit consumption, and, in conjunction with releasing the working data container, update the individual consumption information recorded in the corresponding child data container, according to the tracked unit consumption; and
  wherein the plurality of user devices are sharing the same subscription, wherein the consumption control information comprises a periodic credit allocation, as a consumption allowance, that allows each user device a defined amount of usage of the communication network, wherein the credit allocation is a credited number of units, wherein the processing circuitry is configured to refresh the periodic credit allocation by accessing only the parent data container, and wherein governing consumption by each user device comprises authorizing usage of the communication network by the user device in dependence on verifying that the periodic credit allocation in the parent data container is valid for the current period, and further in dependence on verifying that the user device has remaining units from the credited number of units for the current period, as determined from the individual consumption information recorded for the user device in the corresponding child data container.

10. The charging system node of claim 9, wherein the consumption control information comprises a consumption allowance that provides for the consumption of a defined number of units by each of the user devices, and wherein the individual consumption information recorded for any of the user devices that consumes units subject to the consumption allowance indicates a cumulative consumption or a remaining consumption allowance.

11. The charging system node of claim 10, wherein the consumption allowance is one of two or more consumption allowances, and wherein the individual consumption information for any of the user devices that consumes units subject to any of the two or more consumption allowances indicates the consumption on a per consumption allowance basis.

12. The charging system node of claim 10, wherein each consumption allowance in the consumption control information has a corresponding identifier, and wherein the individual consumption information recorded for any particular user device is subdivided on a per identifier basis.

13. The charging system node of claim 10, wherein, for each consumption allowance in the consumption control information, the consumption control information further comprises a corresponding validity time that defines a window or deadline restricting the consumption of units that are subject to the consumption allowance.

14. The charging system node of claim 9, wherein the processing circuitry is configured to create the child data container for any particular one of the user devices on an as-needed basis, where the child data container is needed to track any unit consumption by the particular user device that is subject to the consumption control information.

15. The charging system node of claim 9, wherein the plurality of user devices is a plurality of Internet-of-Things (IoT) devices.

16. The charging system node of claim 15, wherein, to govern the consumption by any particular IoT device among the plurality of IoT devices, the processing circuitry is configured to form a temporary consolidated data container from the parent data container and the child data container of the particular IoT device, operate on the temporary consolidated data container for rating and authorizing usage of the communication network by the particular IoT device in a current communication session, and save updated consumption information from the temporary consolidated data container to the child data container of the particular IoT device for persistent storage, upon termination of the current communication session.

* * * * *